(12) United States Patent
Hughes et al.

(10) Patent No.: US 10,008,701 B2
(45) Date of Patent: Jun. 26, 2018

(54) BATTERY MODULE SYSTEM

(71) Applicant: A123 Systems, LLC, Waltham, MA (US)

(72) Inventors: Timothy E. Hughes, Livonia, MI (US); Lingchang Wang, Novi, MI (US); Arfan Ahmad, Windsor (CA)

(73) Assignee: A123 Systems, LLC, Waltham, MA (US)

( * ) Notice: Subject to any disclaimer, the term of this patent is extended or adjusted under 35 U.S.C. 154(b) by 373 days.

(21) Appl. No.: 14/970,440

(22) Filed: Dec. 15, 2015

(65) Prior Publication Data

US 2016/0172642 A1 Jun. 16, 2016

Related U.S. Application Data

(60) Provisional application No. 62/092,168, filed on Dec. 15, 2014.

(51) Int. Cl.
*H01M 2/10* (2006.01)
*H01M 2/20* (2006.01)

(52) U.S. Cl.
CPC ......... *H01M 2/1077* (2013.01); *H01M 2/105* (2013.01); *H01M 2/1094* (2013.01); *H01M 2/206* (2013.01); *H01M 2220/20* (2013.01)

(58) Field of Classification Search
CPC .............................. H01M 2/105; H01M 2/1077
USPC .......................................................... 429/90
See application file for complete search history.

(56) References Cited

U.S. PATENT DOCUMENTS

| 2006/0055371 A1 | 3/2006 | Rejman |
| 2010/0136405 A1* | 6/2010 | Johnson ............... H01M 2/105 429/120 |
| 2010/0209759 A1 | 8/2010 | Rejman et al. |
| 2013/0337291 A1 | 12/2013 | Mayer et al. |

FOREIGN PATENT DOCUMENTS

| JP | 2013187088 A | 9/2013 |
| WO | 2013106049 A1 | 7/2013 |

OTHER PUBLICATIONS

ISA Korean Intellectual Property Office, International Search Report and Written Opinion Issued in Application No. PCT/US2015/065904, dated Apr. 4, 2016, WIPO, 12 pages.

* cited by examiner

*Primary Examiner* — Basia Ridley
*Assistant Examiner* — James Erwin
(74) *Attorney, Agent, or Firm* — McCoy Russell LLP

(57) ABSTRACT

A battery is provided comprising a plurality of cylindrical type cells. Three cylindrical cells may be arranged in a triangular configuration with an electrical isolation spacer positioned between the three cylindrical cells, and a casing may be wrapped around the cells to restrict relative movement of the cells forming a cell group. Multiple cells groups, separated by electrical isolation spacers, may be electrically coupled via bus bars and arranged to form a cell module, where multiple cell modules may be included in the battery, and where the cell modules may be electrically coupled via inter-module connectors.

20 Claims, 5 Drawing Sheets

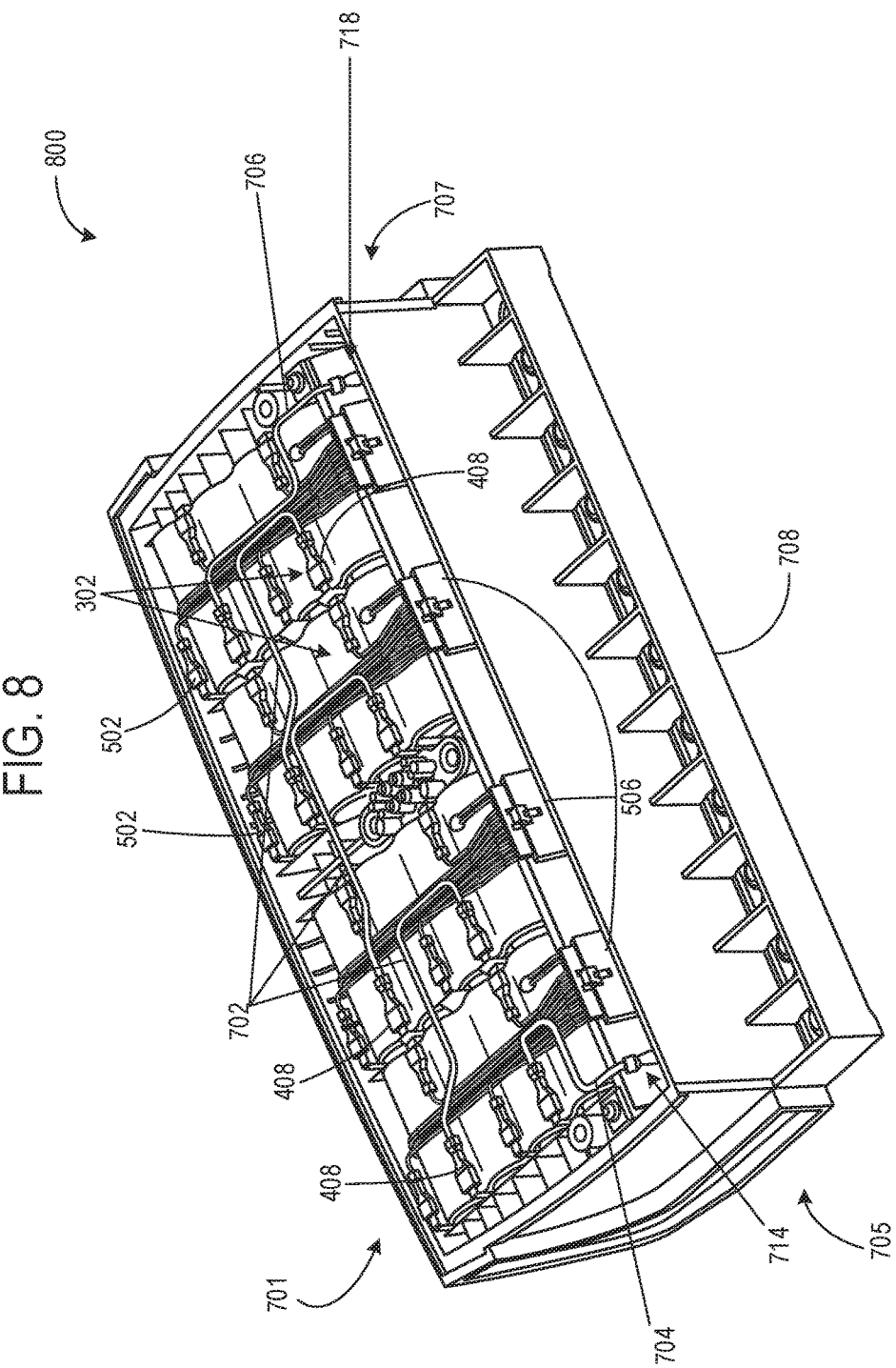

BATTERY MODULE SYSTEM

CROSS-REFERENCE TO RELATED APPLICATION

The present application claims priority from U.S. Provisional Application Ser. No. 62/092,168, filed on Dec. 15, 2014, which is hereby incorporated herein by reference for all purposes.

TECHNICAL FIELD

The present application relates to the modular design of multi-cell battery systems which comprise cylindrical type battery cells.

BACKGROUND AND SUMMARY

Many batteries utilize cylindrical battery cells assembled in series and parallel to meet the current and/or voltage demands of the battery. The battery cells may be stacked and electrically connected to one another via bus bars. Such cylindrical type batteries may be used in hybrid electric vehicles (HEVs) and fully electric vehicles for propulsion.

However, the inventors herein have recognized potential issues with cylindrical type multi-cell batteries. As one example, due to the low packing density of the battery cells in cylindrical type batteries, the batteries may be bulky. As such, the packaging size of a vehicle may be increased to accommodate for the size of the battery. Further, the structural stability of the batteries may be reduced relative to batteries comprising rectangular battery cells, at least in part due to the shape of the cylindrical battery cells. Additionally, such cylindrical type batteries comprise complex electrical circuitry, and as such, diagnosing and correcting issues at a subassembly level may take a significant amount of time.

In one example, the issues described above may be addressed by a battery assembly comprising a cell group, the cell group comprising three cylindrical battery cells arranged in a triangular configuration, an electrical isolation spacer positioned between the three cylindrical battery cells and extending between ends of the battery cells, and a casing wrapped around the battery cells for restricting relative movement of the cells and spacer, the battery further comprising a housing for retaining the cell group.

In another example a battery may comprise a plurality of cylindrical cells, a primary sheath binding three of the plurality of cylindrical cells together to form a cell group, a secondary sheath binding two or more cell groups, a battery cell module comprising the secondary sheath and two or more cell groups, and a housing containing the battery cell module.

In yet another example, a vehicle battery may comprise two or more battery cell modules, each of the two or more battery cell modules comprising two or more cell groups, the two or more cell groups comprising three cylindrical battery cells and a primary sheath wrapped around the cells, two or more electrical isolation spacers positioned between the two or more cell groups, a secondary sheath wrapped around the two or more cell groups, bus bars electrically coupling the cylindrical battery cells of the two or more cell groups, and a voltage monitoring tab, electrically coupled to the bus bars for monitoring voltages of the cylindrical battery cells, an inter-module connector for electrically coupling the two or more battery cell modules, and a housing for retaining the two or more battery cell modules.

In this way, the packing density of a cylindrical type battery may be increased by wrapping the battery cells in groups of three with a sheath. Further, the packing density may be increased by stacking the groups to form cell modules, and then electrically coupling the cell modules via bus bars. By wrapping the cells in groups of three and physically binding them, the rigidity of the cell modules may be increased. Said another way, movement of the cylindrical cells relative to one another may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 8 shows a side perspective view of the battery of FIG. 7, assembled.

Each of these figures is drawn approximately to scale and thus show relative sizing and positioning of components with respect to each other. In alternative embodiments, different relative sizing and/or positioning may be used, if desired.

DETAILED DESCRIPTION OF THE DEPICTED EMBODIMENTS

Figure 1:
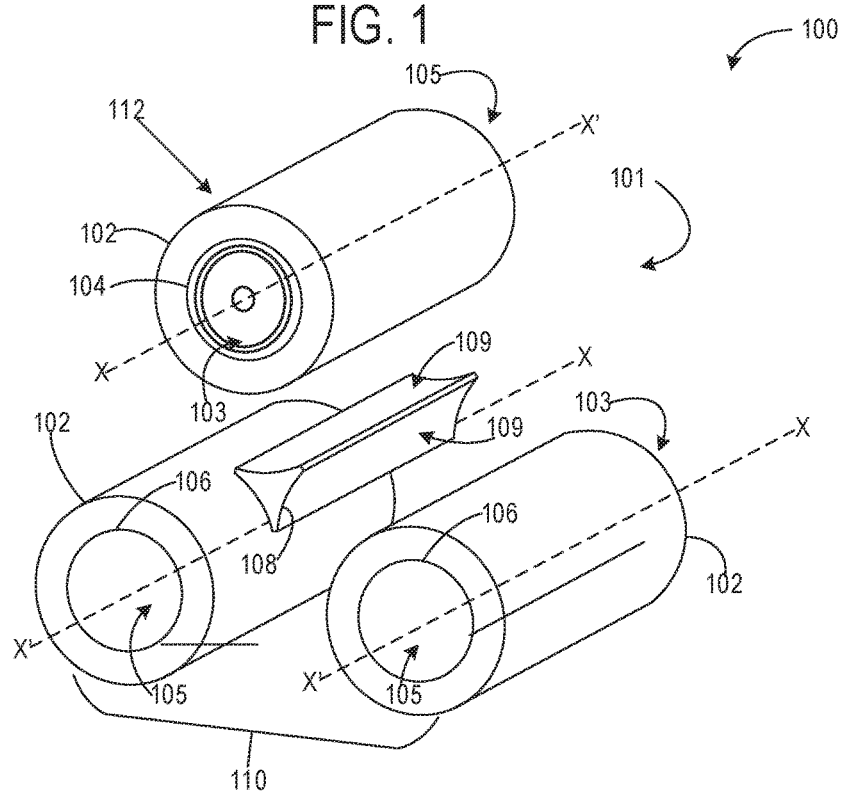
FIG. 1 shows an exploded side perspective view of a cell group of cylindrical battery cells.
Figure 2:
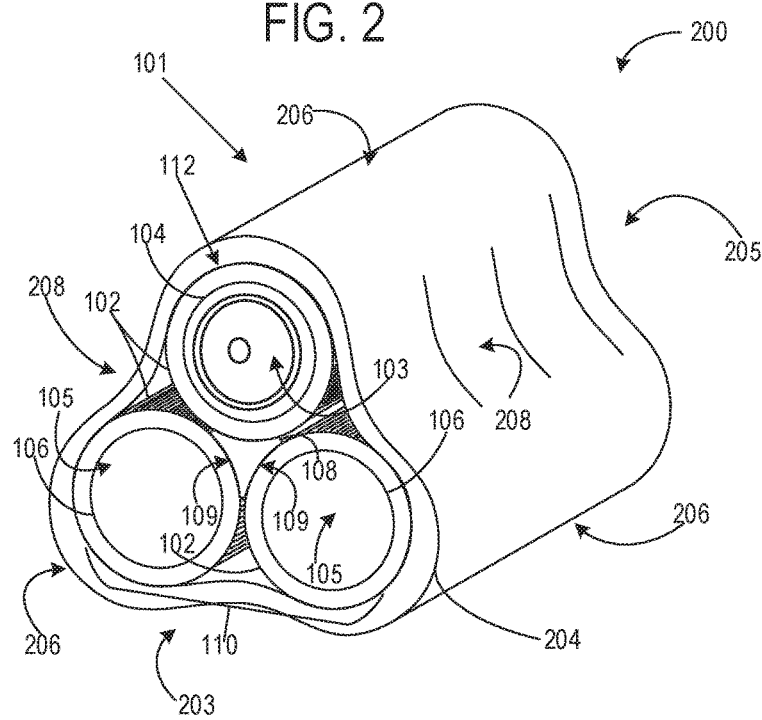
FIG. 2 shows a side perspective view of the cell group of FIG. 1, assembled.
Figure 5:
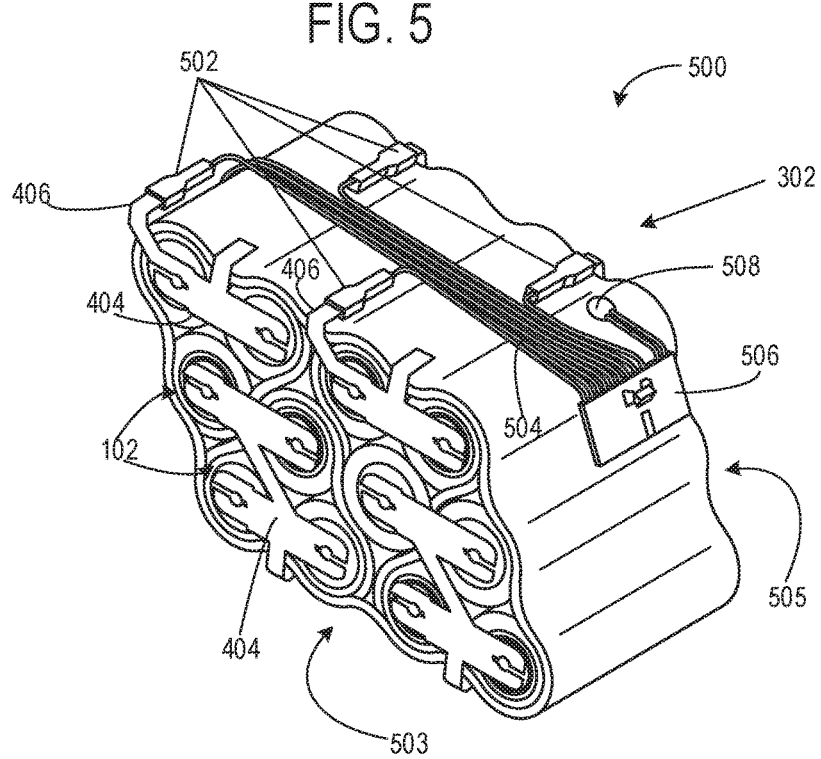
FIGS. 5-6 show side perspective views of the battery module of FIG. 3.
Figure 6:
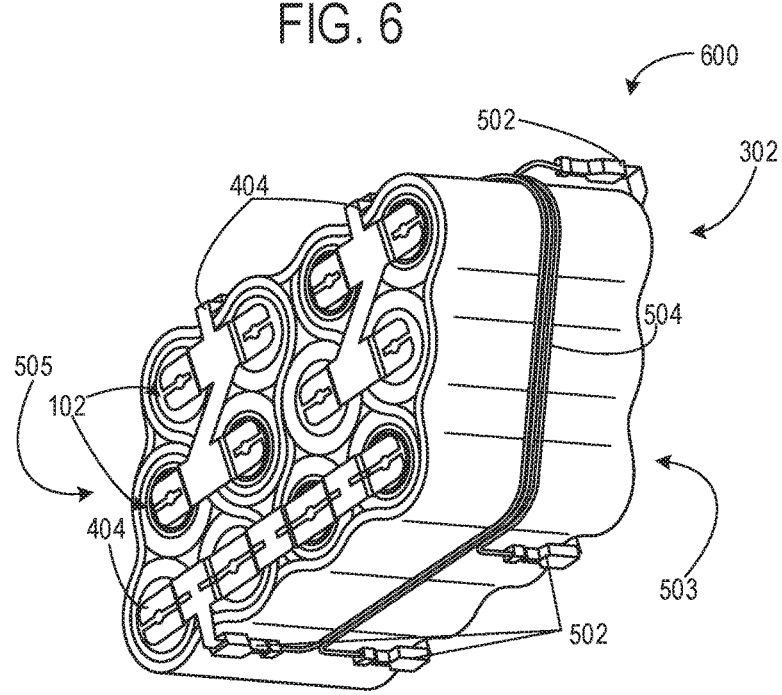
Figure 7:
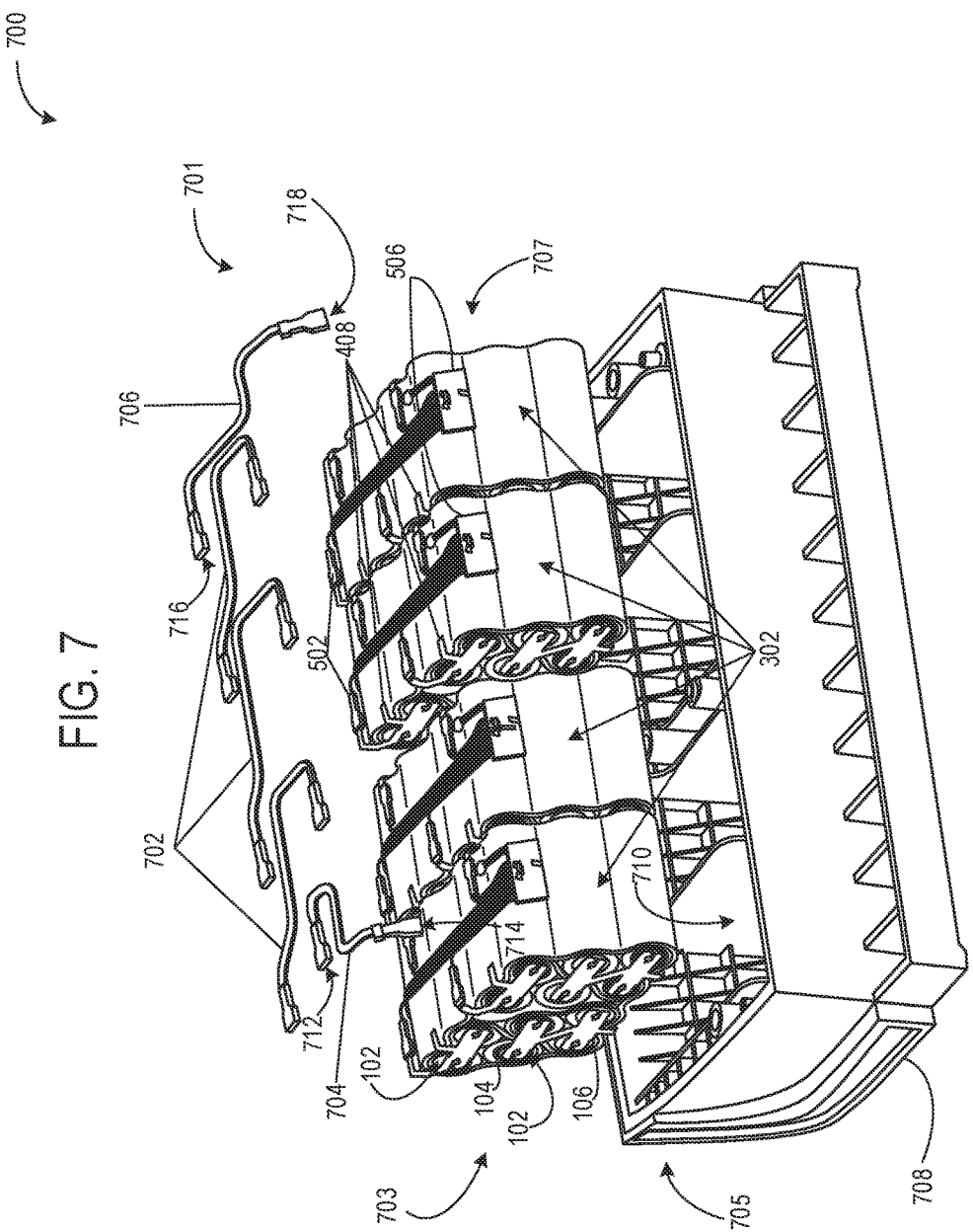
FIG. 7 shows an exploded side perspective view of a battery including multiple battery cell modules.

The following description relates to a modular design of a cylindrical cell type battery. As shown in FIGS. 1 and 2, cylindrical cells may be packed together in groups of three, for example in grouping each with exactly three individual cylindrical cells. Multiple cell groups may then be stacked and secured to one another to form larger assemblies such as the battery cell module shown in FIGS. 3 and 4. Cells may be electrically coupled in series and parallel by bus bars. Bus bar terminals may be electrically coupled to a wiring harness, as shown in the examples of FIGS. 5 and 6, and the wiring harnesses of different cell modules may be electrically coupled to one another via connectors as shown in FIGS. 7 and 8. In this way, several cell modules may be included in a single battery. The modular design may provide a tighter packing density of the cylindrical cells, which may increase the efficiency of the battery, increase the ability to mass produce the battery, and increase the ability to diagnose and to correct malfunctioning components at a subassembly level. Specifically, the relative movement of the cylindrical cells post-assembly may be more restricted, and as such, the structure of the battery cell assembly may remain rigid and maintain a particular configuration. Thus, the structural stability of the battery cell assembly may be increased, which may be a significant design challenge when working with cylindrical cells.

FIGS. 1-8 show example configurations of a battery, such as battery system 701 shown below with reference to FIGS. 7 and 8, with relative positioning of various components of the battery. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components laying in face-sharing contact with each other may be referred to as in face-sharing contact or physically contact one another. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 shows an exploded side perspective view 100 of an exemplary embodiment of a cell block or group 101, which may be included in the battery. The cell group 101 comprises one or more cylindrical battery cells 102, the battery cells 102 each including an anode or negative cell terminal 104 and cathode or positive cell terminal 106, disposed at opposite ends of the battery cells 102. Specifically, each of the battery cells 102 may include the anode 104 at a first end 103 and the cathode 106 at an opposite second end 105. The ends 103 and 105 may be joined by a curved surface 107. Thus, the cylindrical shape of the cells 102 may be defined by the size of the ends 103 and 105, and the contour of the curved surface 107 extending between the ends 103 and 105. As shown in the example of FIG. 1, the cell group 101 may include three battery cells 102. However, it should be appreciated that in other examples, the cell group 101 may include more or less than three of the battery cells 102.

The battery cells 102 may be arranged in a pyramid-like or triangular configuration defining the shape of the cell group 101. Thus, the ends 103 and 105 of the cells 102 may be flush with one another, and the cells 102 may interface with one another via the curved surface 107 of each of the cells 102. The cells 102 in the group 101 may be orientated parallel or antiparallel to one another depending on the orientation of their anodes and cathodes relative to one another. Thus, two or more of the cells 102 may be orientated parallel to one another when the anodes and cathodes of the cells 102 face the same direction. Alternatively, two or more of the cells 102 may be orientated antiparallel to one another when the anodes and cathodes of the cells 102 face opposite directions, such that for any two antiparallel cells 102, the first end 103 of each of the cells 102 is aligned with the second end 105 of the other cell. In examples where the cell group 101 includes three of the cells 102, such as in the example shown in FIG. 1, two of the cells 102 may be orientated parallel to one another, with the anodes and cathodes of the cells 102 pointed in the same direction, and the third cell in the cell group 101 may be orientated in the opposite direction. The two cells orientated in the same direction, may be referred to as a concurrent pair 110 of battery cells 102. The third cell orientated in the opposite direction or antiparallel to the concurrent pair 110 may be referred to as inverse cell 112. Thus, together, the concurrent pair 110 and inverse cell 112 may comprise the cell group 101 in examples where the cell group 101 includes three of the cells 102.

Said another way, when stacked, adjacent battery cells 102 may either be arranged such that the cell terminals 104 and 106 are aligned in a matching orientation where like polarities abut one another or in an alternating configuration where opposite polarities abut one another. Said another way, the anodes and cathodes of adjacent battery cells 102 may be oriented in the same or opposite position relative to one another. Thus, the negative cell terminal 104 of one of the battery cells 102 may be aligned with the negative cell terminal 104 of an adjacent battery cell in a matching orientation, or the negative cell terminal 104 of one of the battery cells 102 may be aligned with the positive cell terminal 106 of another one of the battery cells 102 in an alternating configuration. In examples, where the cells 102 are coupled to one another in groups of three, such as is shown in the example of FIG. 1, two of the three cells 102 in the group 101 may be orientated in the matching orientation.

The group 101 may further include a non-conductive dielectric spacer 108 positioned between cells 102 in the group 101. Specifically, the spacer 108, may be positioned equidistant from a central axis X-X' of each of the cells 102 in the cell group 101. The spacer 108 may be made from an elastomeric extrusion to provide spacing and shock absorption between the cells 102, for example. The spacer 108 may be triangular in shape, with geometry which conforms to the shape of the cells 102. Further, the spacer 108 may extend between the ends 103 and 105 of the battery cells 102. The spacer 108 may include concave surfaces 109. Each of the concave surfaces 109 may physically contact the curved surface 107 of one of the cells 102 in the cell group 101. Thus, the spacer 108, may physically and electrically separate the cells 102 in the cell group 101. As such, the cells 102 in the cell group 101 may not physically contact one another, and instead may only contact the spacer 108. Specifically, the curved surface 107 of each of the cells 102 in the cell group 101 may physically contact the spacer 108, and may not physically contact the curved surface 107 of any of the other cells 102 in the group 101. As such, the cells 102 in the cell group 101 may be physically separated from one another, where the spacer 108 may be positioned between each of the cells 102 in the group 101. However, in other examples, the cells 102 in the cell group 101 may contact one another in addition to contacting the spacer 108. The spacer 108 may be constructed from an electrically insulating material to reduce and/or prevent electric current passing between the cells 102. Said another way, the spacer 108 may ensure proper clearance between cells 102 to maintain an electrical insulating gap. As shown below with reference to FIG. 2, the cells 102 in the cell group 101 may be wrapped and bound together when assembled.

Referring now to FIG. 2, it shows a side perspective view 200 of an exemplary embodiment of the cell block or group 101 when fully assembled. As such components of the cell group 101 already discussed above with reference to FIG. 1, and numbered similarly in FIG. 2 may not be reintroduced or described again in the description of FIG. 2 herein. Thus, the view 200 of the cell group 101, shows the group 101 assembled, where the battery cells 102 may be wrapped in a primary sheath 204. Primary sheath 204, may therefore amalgamate and/or bind the components of the cell group 101, including the cells 102 and the spacer 108. The primary sheath 204 may physically contact the surface 107 of each of the cells 102. However, the primary sheath 204 may not physically contact the ends 103 and 105 of the cells 102. Thus, the ends 103 and 105, and therefore the positive and negative cell terminals, 106 and 104 respectively, may not be covered by the primary sheath 204, and may be exposed. The primary sheath 204 may be a shrink wrapping, polymer plastic, or other suitable media to retain the shape of the cell group 101. Thus, the sheath 204 may comprise a material that when heated, shrinks and conforms to the surface 107 of each of the cells 102 in the cell group 101 to create a rigid structure that restricts relative movement of the cells 102. As such, when sheath 204 shrinks around the cells 102 of the cell group 101, the cell group 101 may comprise a series of apexes 206 and concave ridges 208. In the example shown in FIG. 2, the cell group 101 may comprise three apexes 206 and three concave ridges 208. However, it should be appreciated that the number of apexes 206 and ridges 208 may be greater or less than 3 depending on the number of cells 102 included in the group 101.

In this way, the primary sheath 204 may reduce and/or prevent relative movement of the cells 102 and spacer 108 of the cell group 101. Said another way, the primary sheath 204 may provide an inward compressive force on the cell group 101 that may maintain the shape of the cell group 101. The assembled cell group 101, including the primary sheath 204, may include a first end 203 opposite a second end 205. The first end 203 may comprise the anode 104 of one of the cells 102, which in the example shown in FIG. 2 is the inverse cell 112. As such, the second end 205 may comprise the cathode 106 of the inverse cell 112. It follows therefore, that the first end 203 comprises the cathodes and second end 105 of each of the cells 102 of the concurrent pair 110, and that the second end 203 comprises the anodes and first end 103 of each of the cells 102 of the concurrent pair 110. Thus, the anodes of two of the cells 102 and cathode of one of the cells 102 may be included at the second end and the cathodes of two of the cells 102 and anode of one of the cells 102 may be included at the first end 203 of the cell group 101. As shown below with reference to FIG. 3, the cell group 101, may be included with other cell groups to form a cell module which may be included in the battery.

Figure 3:
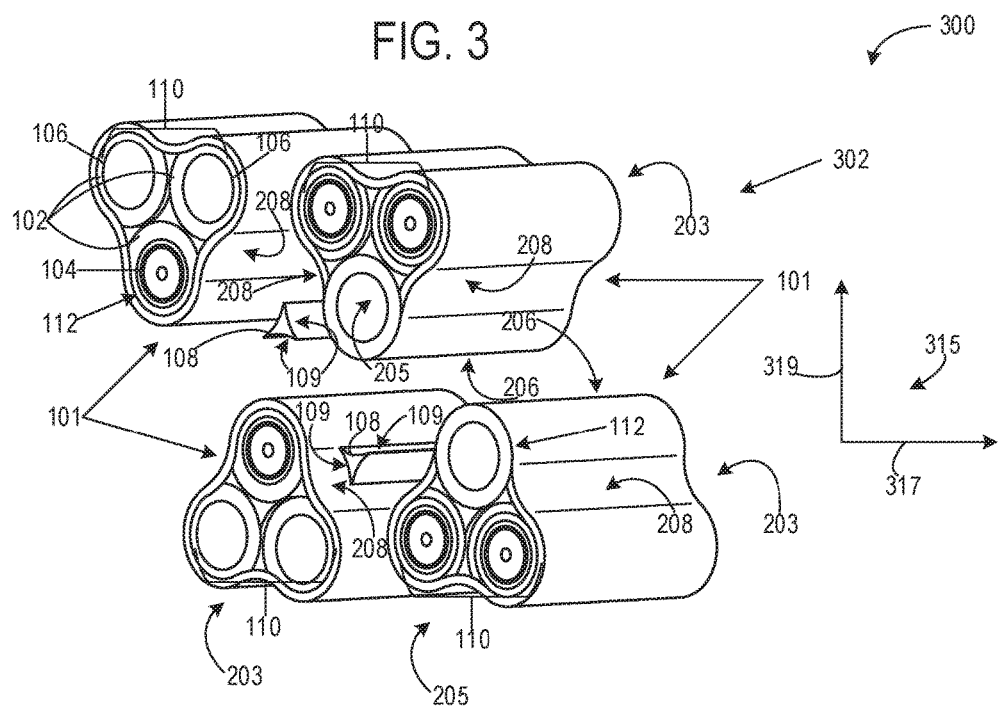
FIG. 3 shows an exploded side perspective view of a battery module including multiple cell groups.

Referring now to FIG. 3, it shows a side perspective view 300 of the cell group 101 combined with other cell groups and arranged to form a battery cell module 302. As such, components of the cell group 101 already discussed above with reference to FIGS. 1 and 2, and numbered similarly in FIG. 3 may not be reintroduced or described again in the description of FIG. 3 herein. The battery cell module 302, may therefore comprise two or more cell groups, where each of the cell groups in battery cell module 302 may be the same as or similar to cell group 101. Thus, it should be appreciated that multiple copies of the cell group 101 may be included in the battery cell module 302. In the example shown in FIG. 3 for instance, the battery cell module 302 may include four copies of the cell group 101. However, it should be appreciated that in other examples more or less than four copies of the cell group 101 may be included in the battery cell module 302. The number of cell groups included in the battery cell module 302 and/or their orientation with respect to one another may be different depending on the specifications of a battery in which the battery cell module 302 is included.

Axis system 315 is shown in FIG. 3 to provide an indication of the relative positioning of components of the battery module 302. The axis system includes a vertical axis 319, and a horizontal axis 317. The vertical axis 319 points up and down in FIG. 3, and the horizontal axis points right and left across FIG. 3. Components of the battery module 302 said to be "horizontally displaced" relative to one another may be displaced with respect to one another along the horizontal axis 317. Similarly, components of the battery module 302 said to be "vertically displaced" relative to one another may be displaced with respect to one another along the vertical axis 319. Thus, the size and/or position of components of the battery module 302 may be described relative to the axis system 315.

Further, dielectric spacer 108 may be positioned between the neighboring copies of the cell group 101. As such, the dielectric spacer 108 may reduce and/or prevent electric current passing between each cell group 101 in the battery cell module 302. Said another way, the spacer 108 may ensure proper clearance between cell groups to maintain an electrical insulating gap. As such, each cell group 101 may only contact the spacer 108 and may not contact another cell group 101 in the battery cell module 302. However, in other examples, the cell groups may physically contact both the dielectric spacer 108 and other cell groups. Specifically, the primary sheath 204 of each cell group 101, may be in physical contact with one of the concave surfaces 109 of the dielectric spacer 108.

Additionally or alternatively, the primary sheath 204 of each cell group 101 may be in physical contact with the primary sheath 204 of one or more other cell groups. Thus, as shown in the example of FIG. 3, where four cell groups are included in the battery cell module 302, two copies of the dielectric spacer 108 may be included between the cell groups in the battery cell module 302. Said another way, the battery cell module 302 may include two dielectric spacers. In total, six copies of the dielectric spacer 108 may be included in the battery cell module 302: four within the four cell groups (one in each cell group 101), and two included between the cell groups. However, it should be appreciated that more or less than six copies of the dielectric spacer 108 may be included in the battery cell module 302 depending on the number of copies of the cell group 101 included in the battery cell module 302.

The cell groups may be orientated so that one of the apexes 206 of each cell group 101 fits between adjacent concave ridges 208 of two other cell groups. In this way, the dielectric spacer 108, when positioned between the cell groups, may be positioned between one of the apexes 206 of a cell group 101, and concave ridges 208 of two other cell groups in the battery cell module 302. Thus, when assembled, as shown below with reference to FIG. 4, the inverse cell 112 of each cell group 101 may be adjacent and/or substantially aligned with the inverse cell 112 of an adjacent cell group. As such, the inverse cells of adjacent cell groups may be substantially parallel to the concurrent pair 110 of each cell group 101. Further, the cells 102 may be orientated in the battery cell module 302 such that the concurrent pairs 110 are parallel to one another.

Further, half of the cell groups included in the battery cell module 302 may be orientated parallel to one another, and antiparallel to the other half of the cell groups. Thus, in the example shown in FIG. 3, where four cell groups are included in the battery cell module 302, two of the cell groups may be orientated in the some direction such that the first end 03 of each parallel cell group is aligned. Said another way, two pairs of parallel cell groups, each pair antiparallel to one another may be included in the cell module 302. Thus, six anodes and six cathodes may be aligned at each end of the battery cell module 302.

In this way, when proceeding along the vertical axis 319 of axis system 315, the polarity of the battery cells terminals (e.g., anode 104 and cathode 106) may alternate. Thus, an anode 104 may be stacked above a cathode 106 and below a cathode 106. Similarly, a cathode 106 may be stacked both above an anode 104, and below and anode 104. However, when proceeding along the horizontal axis 317 of axis system 315, the battery cells 102 may be arranged such that there are alternating pairs of terminals of the same polarity. Thus, two cathodes may be followed by two anodes, as shown in the example of FIG. 3. Thus, the cells 102 may be stacked so that they form rows of cells, where the rows are parallel to one another and the horizontal axis 317.

Figure 4:
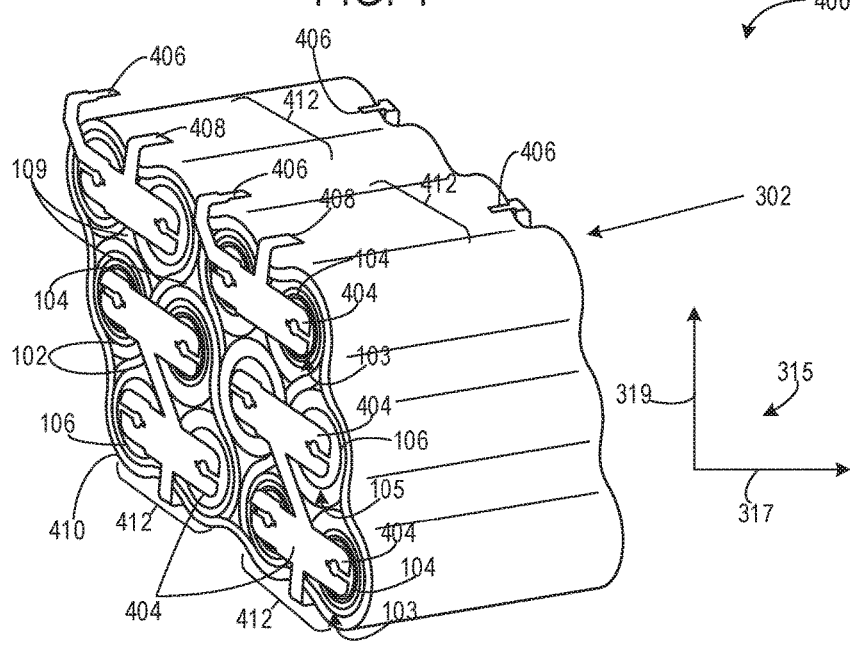
FIG. 4 shows a side perspective view of the battery module of FIG. 3, assembled.

Turning now to FIG. 4, it shows a side perspective view 400 of an exemplary embodiment of battery cell module 302 when assembled, which may be included in the battery. As such components of the battery cell module 302 already discussed above with reference to FIGS. 1-3, and numbered similarly in FIG. 3, may not be reintroduced or described again in the description of FIG. 4 herein. Thus, the view 400 of the battery cell module 302, shows the battery cell module 302 assembled, where the cell groups may be wrapped in a secondary sheath 410. Secondary sheath 410, may therefore amalgamate the components of the battery cell module 302, including the cell groups and dielectric spacers. The secondary sheath 410 may physically contact the primary sheath 204 of each of cell group 101 in the battery cell module 302. However, the secondary sheath 410 may not physically contact the ends 103 and 105 of the cells 102. Thus, the ends 103 and 105 may not be covered by the secondary sheath 410, and may be exposed. The secondary sheath 410 may be a shrink wrapping, polymer plastic, or other suitable media to retain the shape of the cell group 101. Thus, the secondary sheath 410 may comprise a material that when heated, shrinks and conforms to the primary sheath 204 of each cell group 101 in the battery cell module 302, thus defining the shape of the battery cell module 302. The secondary sheath 410, may therefore create a rigid structure encasing the cell groups of the battery cell module 302, and thus restricting relative movement of the cell groups. In some examples, the secondary sheath 410 may be constructed from the same material as primary sheath 204. However, in other examples, the secondary sheath 410 may be constructed from a different material than the primary sheath 204. Once wrapped with the secondary sheath 410, the battery cell module 302 may become a rigid assembly. Thus, the secondary sheath 410, may provide structural stability to the battery cell module 302, and may restrict and/or inhibit the relative movement of components of the battery cell module 302 with respect to one another. Said another way, the secondary sheath 410 may provide an inward compressive force, that may maintain the relative positions of the cells groups, dielectric spacers, and other components of the battery cell module 302.

Each anode 104 and cathode 106 may be electrically connected using any state-of-the-art connection techniques. In the example shown in FIG. 4 welded bus bars 404 may be coupled to the electrical terminals (e.g., anode 104 and cathode 106) of the cells 102 to provide electrical communication there-between. Specifically, the bus bars 404 may electrically couple adjacent cells 102 in parallel. For example, as shown in FIG. 4, a concurrent pair 110 may be electrically coupled in parallel via the bus bars 404. Further, the inverse cell 112 of a cell group 101 may be electrically coupled in parallel with the inverse cell 112 of an adjacent cell group 101 via the bus bars 404. Thus, the bus bars 404 may electrically couple adjacent cell terminals of the same polarity in parallel to form a parallel pair 412. A parallel pair 412, may therefore comprise two adjacent cells 102 electrically coupled in parallel with one another. Thus, the anodes of a parallel pair 412 may be electrically coupled to one another via the bus bars 404, and the cathodes of a parallel pair 412 may be electrically coupled to one another via the bus bars 404. As such, the bus bars 404 may electrically couple the anodes of two adjacent cells 102 in parallel with one another. Similarly, the bus bars 404 may electrically couple the cathodes of two adjacent cells 102 in parallel with one another.

Said another way, the battery cells 102 may be electrically coupled to one another in series in parallel by bus bars 404. Two cells 102 from either the same or different cell group 101 may be electrically coupled in parallel to form the parallel pair 412. Thus, in the example shown in FIG. 4, the battery module 302 may comprise six parallel pairs. Each parallel pair 412 may then be arranged in series with one another by way of the bus bars 404.

Thus, in the example of FIG. 4, where the battery cell module 302 is shown to include 12 cells 102, the cells 102 may be electrically coupled to one another via the bus bars 404 to form 6 parallel pairs. However more or less than 6 parallel pairs may be formed depending on the number of cells 102 included in the battery cell module 302. Each of the bus bars 404 may be substantially physically parallel to one another, and may electrically couple the parallel pairs in series with one another.

The bus bars 404 may further include terminals for electrically coupling the bus bars 404 to outputs of the battery module 302. Specifically the bus bars 404 may include current transfer or interconnect terminals 408 and voltage monitoring terminals 406. The interconnect terminals 408 may provide current output from the battery cell module 302. As explained in greater detail below with reference to FIGS. 7 and 8, multiple batter modules may be electrically coupled to one another at their interconnect terminals 408 via electrical connectors. The voltage monitoring terminals 406 may be electrically connected to a battery management system for monitoring of the cell voltages as explained in greater detail below with reference to FIGS. 5-8.

Turning now to FIGS. 5-6, they show different side perspective views 500 and 600 respectively that depict the battery cell module 302 with voltage connectors 502 electrically coupled to the voltage monitoring terminals 406 on one end and a wiring harness 504 on another other end. FIGS. 5 and 6 may therefore be described together in the description herein. As such components of the battery cell module 302 already discussed above with reference to FIGS. 1-4, and numbered similarly in FIGS. 5 and 6, may not be reintroduced or described again in the description of FIGS. 4 and 5 herein. Specifically, FIG. 5 shows a front side perspective view 500 of the battery cell module 302, where a front side 503 of the battery cell module 302 is displayed and where a back side 505 of the battery cell module 302 is hidden from view. FIG. 6 shows a back side perspective view 600 of the battery cell module 302 displaying the back side 505. Thus, FIG. 6, shows the battery module 302, flipped approximately 180 degrees relative to the view 500 shown in FIG. 5.

The wiring harness 504, may be coupled to the voltage connectors 502, and a battery management connector 506, for providing electrical communication there-between. Together, the connectors 502 and wiring harness 504, may provide an electrical connection between the voltage monitoring terminals 406 and the battery management connector 506 which may be electrically coupled to a battery management system (not shown). Additionally, a thermistor 508 may be electrically coupled to the wiring harness 504 to measure and monitor the temperature of the battery cells 102. Thus, outputs from the thermistor 508 may be used to estimate a temperature of the battery cells 102.

FIGS. 7-8 show schematics 700 and 800 respectively that depict multiple battery cell modules assembled into a housing 708 and electrically connected to one another via inter-module connectors 702 to form a battery. Thus, FIGS. 7 and 8 may be described together in the description herein. Specifically, FIG. 7 shows an exploded side perspective view 700 of a modular battery or assembly 701. FIG. 8 shows a side perspective view 800 of the battery system 701 when assembled.

Thus, multiple copies of the battery module 302 may be electrically coupled to one another to form a battery module array 703, which may be included in the battery system 701. As such components of the battery cell module 302 already discussed above with reference to FIGS. 1-6, and numbered similarly in FIGS, 7 and 8, may not be reintroduced or described again in the description of FIGS. 7 and 8 herein. In the examples shown in FIGS. 7-8, four copies of the battery module 302 may be included in the battery system 701. However, it should be appreciated that in other examples, more or less than four battery cell modules may be included in the array 703 and battery system 701. The battery cell modules may be aligned parallel with respect to one another such that the cell terminals 104 and 106 of different battery cell modules face each other. Further, the battery management connector 506 of each module 302 may aligned on the same side of the array 703.

The inter-module connectors 702 may be electrically coupled on either end to interconnect terminals 408 of different battery cell modules. Thus, the inter-module connectors 702 may electrically connect the interconnect terminals 408 of adjacent battery cell modules 302. Said another way, two copies of the battery module 302 that are positioned adjacent to one another may be electrically coupled to one another in series via inter-module connectors 702, coupled to their respective interconnect terminals 408. Thus, in the examples shown in FIGS. 7 and 8, where the battery system 701 includes four copies of the battery cell module 302, three inter-module connectors 702 may be included in the battery system 701 to electrically couple the modules together in series. However, it should be appreciated that more or less than three inter-module connectors 702 may be used depending on the number of battery modules included in the battery system 701. The number of connectors 702, may be equivalent to one less than the number of battery cell modules included in the battery system 701.

A negative cell connector 704 may be electrically coupled to a negative first terminal end 705 of the battery system 701. Specifically, a first end 712 of the connector 704 may be coupled to one of the interconnect terminals 408 of the battery module 302 positioned nearest the negative first terminal end 705 of the battery system 701, and an opposite second end 714 of the connector 704 may form and/or may be coupled to a negative terminal of the battery system 701. Thus, the negative cell connector 704 may form a part or all of the negative terminal of the battery system 701. A positive cell connector 706 may be electrically coupled to an opposite positive second terminal end 707 of the battery system 701. Specifically, a first end 716 of the positive cell connector 706 may be coupled to one of the interconnect terminals 408 of the battery module 302 positioned nearest the positive second terminal end 707 of the battery system 701, and an opposite second end 718 of the connector 707 may form and/or may be coupled to a positive terminal of the battery system 701. Thus, the positive cell connector 706 may form a part or all of the positive terminal of the battery system 701. In this way, the second ends 714 and 718 of the negative cell connector 704 and positive cell connector 706, respectively, may be aligned on the same side of the array 703 as each management connector 506.

Housing 708 may include a recess 710 which may be sized and configured to retain the battery cell modules. The housing 708 may be a rigid structure, and may restrict relative movement of the battery cell modules and their components within the housing 708. Together, the housing 708, array 701 of battery cell modules, and the connectors 702, 704, and 706 may form the battery system 701. Thus, the battery system 701 may include four battery cell modules, each module comprising four battery cell groups, and each cell group comprising three cylindrical battery cells 102. Thus, the battery system 701 may include 16 battery cell groups, and therefore 48 battery cells 102.

In this way, a battery assembly may comprise a cell group comprising three cylindrical battery cells arranged in a triangular configuration an electrical isolation spacer positioned between the three cylindrical battery cells and extending between ends of the battery cells, and a casing wrapped around the battery cells for restricting relative movement of the cells and spacer, and a housing for retaining the cell group. In the above example of the battery assembly, two of the three cylindrical battery cells may be orientated in the same parallel direction, opposite an antiparallel direction of a third of the three cylindrical battery cells, and wherein the spacer is equidistant from a central axis of each of the three cylindrical battery cells. Any of the above battery assemblies or combination of the above battery assemblies may further comprise two or more battery cell modules, where each of the two or more battery cell modules may include the cell group. In any of the above battery assemblies or combination of the above battery assemblies each of the two or more battery cell modules may further comprise three additional cell groups physically coupled to the cell group via a second casing wrapped around the three additional cell groups and the cell group for restricting relative movement of the three additional cell groups and cell group. In any of the above battery assemblies or combination of the above battery assemblies each of the two or more battery cell modules may further comprise two secondary electrical isolation spacers positioned between the three additional cell groups and the cell group. In any of the above battery assemblies or combination of the above battery assemblies two of the three additional cell groups may be orientated antiparallel to the cell group. Any of the above battery assemblies or combination of the above battery assemblies may further comprise bus bars electrically coupling cylindrical cells of the three additional cells groups and the cell group, where the bus bars may further comprise voltage monitoring terminals, and current transfer terminals. Any of the above battery assemblies or combination of the above battery assemblies may further comprise a wiring harness electrically coupling the voltage monitoring terminals to a voltage management connector for providing an indication of voltages of the battery cells.

In another representation, a battery may comprise a plurality of cylindrical cells, a primary sheath binding three of the plurality of cylindrical cells together to form a cell group, a secondary sheath binding two or more cell groups, a battery cell module comprising the secondary sheath and two or more cell groups, and a housing containing the battery cell module. In the above battery, the three of the plurality of cylindrical cells may be arranged in a triangular configuration, and the primary sheath may be wrapped around a curved surface of each of the three of the plurality of cylindrical cells. In any of the above batteries or combination of batteries the cell group may comprise a non-conductive electrical isolation spacer, positioned between the three of the plurality of cylindrical cells for limiting current flow between the three of the plurality of cylindrical cells. In any of the above batteries or combination of batteries the battery cell module may further comprise two electrical isolation spacers positioned between the two or more battery cell groups. In any of the above batteries or combination of batteries the primary sheath may be constructed from a plastic polymer which when heated, may shrink and conform to the shape of the three of the plurality of cylindrical cells and create a rigid structure around the three of the plurality of cylindrical cells. In any of the above batteries or combination of batteries the plurality of cylindrical cells may comprise a positive terminal and a negative terminal, and where two of the three of the plurality of cylindrical cells may be aligned in the same orientation such that a first end of the cell group includes two negative terminals and a second end of the cell groups includes two positive terminals. In any of the above batteries or combination of batteries the battery module may further comprise bus bars, where the bus bars may electrically couple the plurality of cylindrical cells in series or parallel, and where the bus bars may comprise voltage monitoring terminals and interconnect terminals. In any of the above batteries or combination of batteries the battery module may further comprise a voltage management connector electrically coupled to the voltage monitoring terminals, for providing an indication of the voltages of the plurality of cylindrical cells. Any of the above batteries or combination of batteries may further comprise, an inter-module connector electrically coupled to one of the interconnect terminals, where the connector may provide electrical communication between the battery module and an adjacent battery module included in the battery.

In yet another representation, a vehicle battery may comprise two or more battery cell modules, where each of the two or more battery cell modules may comprise two or more cell groups, and where the two or more cell groups may comprise three cylindrical battery cells and a primary sheath wrapped around the cells, two or more electrical isolation spacers positioned between the two or more cell groups, a secondary sheath wrapped around the two or more cell groups, bus bars electrically coupling the cylindrical battery cells of the two or more cell groups, and a voltage monitoring tab electrically coupled to the bus bars for monitoring voltages of the cylindrical battery cells. The battery may additionally include an inter-module connector for electrically coupling the two or more battery cell modules, and a housing for retaining the two or more battery cell modules. In the above vehicle battery, the primary sheath and secondary sheath may comprise a plastic polymer. In any of the above vehicle batteries or combination of vehicle batteries the two or more battery cell modules may be aligned parallel to one another.

In this way, a technical effect of increasing packing density of cylindrical battery cells is achieved by wrapping the battery cells in groups of three, stacking the groups in a cell modules, and then electrically coupling the cell modules via connectors. By wrapping the cells in groups of three and physically binding them with a shrink wrap or other viable encasing, the rigidity of the cell modules may be increased. Said another way, movement of the cells relative to one another may be reduced. The structural integrity of the battery may further be increased by stacking two of the cell groups on top of two other cell groups and then wrapping and binding the four cells groups with a shrink wrap or other viable encasing to form the cell modules.

While exemplary embodiments are described above, it is not intended that these embodiments describe all possible forms of the invention. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The invention claimed is:

1. A battery assembly comprising:
   a cell group comprising:
      three cylindrical battery cells arranged in a triangular configuration;
      an electrical isolation spacer positioned between the three cylindrical battery cells and extending between ends of the battery cells; and
      a casing wrapped around the battery cells for restricting relative movement of the cells and spacer; and
   a housing for retaining the cell group.

2. The battery assembly of claim 1, wherein two of the three cylindrical battery cells are orientated in the same parallel direction, opposite an antiparallel direction of a third of the three cylindrical battery cells, and wherein the spacer is equidistant from a central axis of each of the three cylindrical battery cells.

3. The battery assembly of claim 1, further comprising two or more battery cell modules, where each of the two or more battery cell modules includes the cell group.

4. The battery assembly of claim 3, wherein each of the two or more battery cell modules further comprises three additional cell groups physically coupled to the cell group via a second casing wrapped around the three additional cell groups and the cell group for restricting relative movement of the three additional cell groups and cell group.

5. The battery assembly of claim 4, wherein each of the two or more battery cell modules further comprises two secondary electrical isolation spacers positioned between the three additional cell groups and the cell group.

6. The battery assembly of claim 4, wherein two of the three additional cell groups are orientated antiparallel to the cell group.

7. The battery assembly of claim 4, further comprising bus bars electrically coupling cylindrical cells of the three additional cells groups and the cell group, the bus bars further comprising voltage monitoring terminals, and current transfer terminals.

8. The battery assembly of claim 7, further comprising a wiring harness electrically coupling the voltage monitoring terminals to a voltage management connector for providing an indication of voltages of the battery cells.

9. A battery system comprising:
- a plurality of cylindrical cells;
- a primary sheath binding three of the plurality of cylindrical cells together to form a cell group;
- a secondary sheath binding two or more cell groups;
- a battery cell module comprising the secondary sheath and two or more cell groups; and
- a housing containing the battery cell module.

10. The battery system of claim 9, wherein the three of the plurality of cylindrical cells are arranged in a triangular configuration, and where the primary sheath is wrapped around a curved surface of each of the three of the plurality of cylindrical cells.

11. The battery system of claim 9, wherein the cell group comprises a non-conductive electrical isolation spacer, positioned between the three of the plurality of cylindrical cells for limiting current flow between the three of the plurality of cylindrical cells.

12. The battery system of claim 9, wherein the battery cell module further comprises two electrical isolation spacers positioned between the two or more battery cell groups.

13. The battery system of claim 9, wherein the primary sheath is constructed from a plastic polymer which when heated, shrinks and conforms to the shape of the three of the plurality of cylindrical cells and creates a rigid structure around the three of the plurality of cylindrical cells.

14. The battery system of claim 9, wherein the plurality of cylindrical cells comprise a positive terminal and a negative terminal, and where two of the three of the plurality of cylindrical cells are aligned in the same orientation such that a first end of the cell group includes two negative terminals and a second end of the cell groups includes two positive terminals.

15. The battery system of claim 9, wherein the battery module further comprises bus bars, where the bus bars electrically couple the plurality of cylindrical cells in series or parallel, and where the bus bars comprise voltage monitoring terminals, and interconnect terminals.

16. The battery system of claim 15, wherein the battery module further comprises a voltage management connector electrically coupled to the voltage monitoring terminals, for providing an indication of the voltages of the plurality of cylindrical cells.

17. The battery system of claim 15 further comprising, an inter-module connector electrically coupled to one of the interconnect terminals, and providing electrical communication between the battery module and an adjacent battery module included in the battery for conducting electrical current there-between.

18. A vehicle battery comprising:
- two or more battery cell modules, each of the two or more battery cell modules comprising:
  - two or more cell groups, the two or more cell groups comprising exactly three cylindrical battery cells and a primary sheath wrapped around the cells;
  - two or more electrical isolation spacers positioned between the two or more cell groups;
  - a secondary sheath wrapped around the two or more cell groups;
  - bus bars electrically coupling the cylindrical battery cells of the two or more cell groups; and
  - a voltage monitoring tab, electrically coupled to the bus bars for monitoring voltages of the cylindrical battery cells;
- an inter-module connector for electrically coupling the two or more battery cell modules; and
- a housing for retaining the two or more battery cell modules.

19. The vehicle battery of claim 18, wherein the primary sheath and secondary sheath comprise a plastic polymer.

20. The vehicle battery of claim 18, wherein the two or more battery cell modules are aligned parallel to one another.

* * * * *